United States Patent [19]
Yano et al.

[11] Patent Number: 6,031,357
[45] Date of Patent: Feb. 29, 2000

[54] BATTERY CHARGE CONTROL CIRCUIT

[75] Inventors: Katsuaki Yano, Atsugi; Yasuhisa Higashijima, Hadano, both of Japan

[73] Assignee: Mitsumi Electric Co., Ltd., Tokyo, Japan

[21] Appl. No.: 09/289,912

[22] Filed: Apr. 13, 1999

[30] Foreign Application Priority Data

Apr. 28, 1998 [JP] Japan .................................. 10-119028

[51] Int. Cl.⁷ ................................................... H01M 10/46
[52] U.S. Cl. ........................................... 320/135; 320/137
[58] Field of Search ..................................... 320/125, 127, 320/128, 135, 137, 158, 163, DIG. 13

[56] References Cited

U.S. PATENT DOCUMENTS

| | | | |
|---|---|---|---|
| 3,659,179 | 4/1972 | Barker et al. ........................... | 320/160 |
| 3,950,689 | 4/1976 | Jamison .................................. | 320/127 |
| 5,892,353 | 4/1999 | Yama ...................................... | 323/282 |

*Primary Examiner*—Edward H. Tso
*Attorney, Agent, or Firm*—Ladas & Parry

[57] ABSTRACT

A battery charge control circuit has a first transistor and a second transistor. The first transistor is cut off when an output terminal voltage is lower than a line terminal voltage and closes when it is not. The second transistor closes when the first terminal is cut off so as to supply an actuating current to a circuit generating a constant voltage. The closing of the second transistor causes an output transistor current to be variably adjusted and a battery connected to the output terminal to be charged using only the first and second transistors. This simple circuit structure makes it possible to reduce the number of elements and thus the size of the battery charge control circuit and to prevent improper operation.

2 Claims, 4 Drawing Sheets

BATTERY CHARGE CONTROL CIRCUIT

BACKGROUND OF THE INVENTION

1. Field of the Invention

The present invention relates generally to a battery charge control circuit, and more particularly, to a battery charge control circuit that adjusts the charging of a battery depending on a difference in voltage between a supply voltage and an output charge voltage.

2. Description of the Related Art

Conventionally a battery charge control circuit like that shown in FIG. 4 is known. As shown in FIG. 4, the conventional battery charge control circuit has a line terminal 10 to which a supply voltage Vcc is supplied, with the battery to be charged connected to an output terminal 12. The line terminal 10 is connected to the emitter of a PNP-type output transistor Q1. The collector of transistor Q1 is connected to the output terminal 12 via a current-sensing resistor R1.

Within the semiconductor integrated circuit, between a ground line 16 and a power line 14 connected to the line terminal 10, a constant-current power supply 18 and a Zener diode 20 are connected in series. A reference voltage Vref is generated at the Zener diode 20. Additionally, one end of a resistor R3 is connected to the constant-current power supply 18, the other end of the resistor R3 being connected to the collector of an NPN-type transistor Q3. Transistor Q3 is connected across a collector-base gap and at the same time that base is jointly connected to the base of an NPN-type transistor Q4, the respective emitters of transistors Q3 and Q4 being grounded to form a current mirror circuit.

The collector of transistor Q4 is connected to the collector and base of PNP-type transistor Q5. Transistor Q5 is jointly connected to the respective bases of transistors Q6, Q7, Q8 and Q9, the emitters of transistors Q5, Q6, Q7, Q8 and Q9 being connected to the power line 14 to form a current mirror circuit. Transistor Q9 supplies an actuating current to an operational amplifier 22, transistor Q8 supplies an actuating current to a comparator 24, transistor Q7 supplies an actuating current to a constant-voltage power supply 28 and transistor Q6 supplies an actuating current to a differential amplifier 26.

The differential amplifier 26 comprises the operational amplifier 22 together with resistors R4, R5, R6 and R7. The differential amplifier 26 differentially amplifies an output voltage Vbat of output terminal 12 supplied to an inverted input terminal via resistor R4 and a supply voltage Vcc supplied to a noninverted input terminal via resistor R6, and supplies that differential voltage to a noninverted input terminal of the comparator 24. The reference voltage Vref generated at the Zener diode 20 is supplied to the inverted input terminal of the comparator 24, the comparator 24 outputting a LOW signal when the differential voltage is less than the reference voltage Vref and a HIGH signal when the differential voltage is greater than the reference voltage Vref.

The signal output from the comparator is supplied to the base of a control transistor Q2, the control transistor Q2 being forcibly cut off when the differential voltage is less than the reference voltage Vref. This forcible cutting off of the control transistor Q2 when the differential voltage is less than the reference voltage Vref is provided in order to prevent current from flowing in reverse from the battery to this circuit when the line terminal 10 voltage is less than the output terminal 12 voltage during insertion and removal of the power supply Vcc adapter from the charge circuit.

The constant-voltage power supply 28 is supplied with an actuating current and generates a constant voltage Vreg that is then supplied to the noninverted input terminal of the differential amplifier 26. A voltage Vbat from the output terminal 12 is supplied to the inverted input terminal of the differential amplifier 26. The differential amplifier 26 then supplies the difference in voltage between Vbat and Vreg to the base of control transistor Q2. As a result, when the comparator output is HIGH, control transistor Q2 transmits a collector current corresponding to the difference in voltage between Vbat and Vreg and output transistor Q1 adjusts the output current based on that collector current, so that the voltage Vbat of output terminal 12 is adjusted to a value corresponding to a constant voltage Vreg.

The conventional battery charge control circuit shown in FIG. 4 requires operational amplifier 22 and resistors R4 through R7 as well as comparator 24 in order to determine whether or not the difference in voltage between the supply voltage Vcc and the output voltage Vbat exceeds a reference voltage Vref, thus requiring a large number of elements and thereby increasing the size of the circuit. Additionally, further cumbersome measures must be taken to ensure that the operational amplifier 22 and comparator 24 are started before the differential amplifier 26 and constant-voltage power supply 28 in order to prevent improper operation at start-up.

SUMMARY OF THE INVENTION

Accordingly, it is an object of the present invention to provide a battery charge control circuit in which the problems described above are eliminated.

Another and more specific object of the present invention is to provide a battery charge control circuit with a simple circuit structure, in which the number of required elements can be reduced, thereby reducing the size of the circuit, and improper operation at start-up can be prevented.

The above-described objects of the present invention are achieved by a battery charge control circuit for charging a battery by variably adjusting a current of an output transistor provided between a line terminal and an output terminal to which a battery is connected based on a difference in voltage between a voltage of a power supply and a voltage of the output terminal, the battery charge control circuit comprising:

a first transistor that is cut off when the voltage of the output terminal is lower than a voltage of the line terminal and closed when it is not; and a second transistor that closes to supply an actuating current to a circuit that generates a constant voltage when the first transistor is cut off.

According to the present invention, by cutting off the first transistor when the output terminal voltage is lower than the power supply terminal voltage to close a second transistor and supply an actuating current to the circuit generating a constant voltage, it is possible to adjust the output transistor current using only the first and second transistors.

Additionally, the above-described objects of the present invention are also achieved by the battery charge control circuit as described above, the second transistor supplying an actuating current to a circuit obtaining a difference in voltage between the power supply and the voltage of the output terminal to which the battery is connected when the second transistor is closed.

According to the present invention, by supplying an actuating current to a circuit obtaining a difference in voltage between the power supply and the voltage of the output terminal to which the battery is connected when the second transistor is closed, it is possible to reduce the consumption of electric current when the battery is not being charged.

Other objects, features and advantages of the present invention will become more apparent from the following detailed description when read in conjunction with the accompanying drawings.

DESCRIPTION OF THE PREFERRED EMBODIMENTS

A detailed description will now be given of an embodiment of a battery charge control circuit according to the present invention, with reference to FIG. 1 through FIG. 3.

Figure 1:
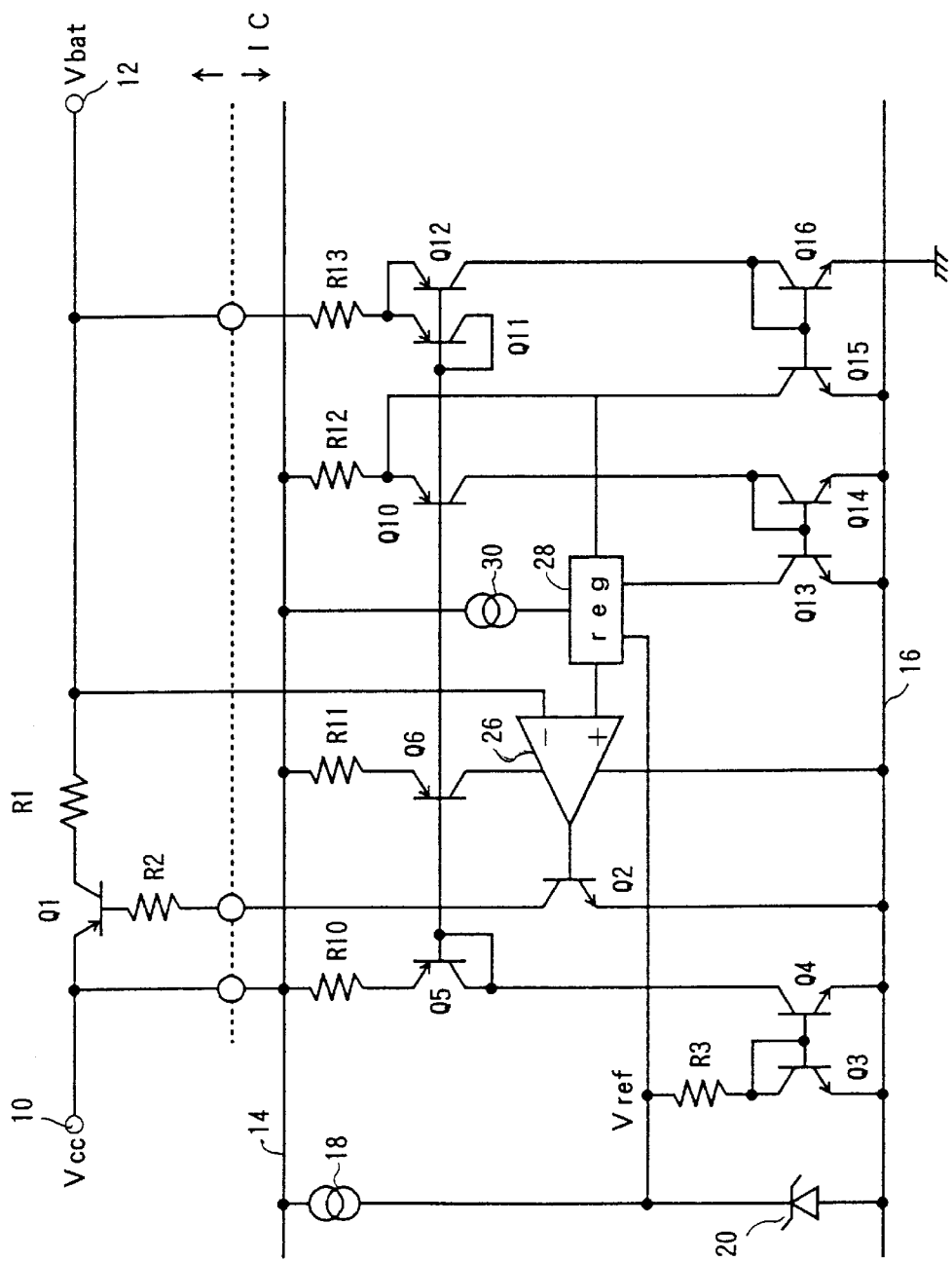
FIG. 1 is a circuit diagram of a first embodiment of a battery charge control circuit according to the present invention.
Figure 4:
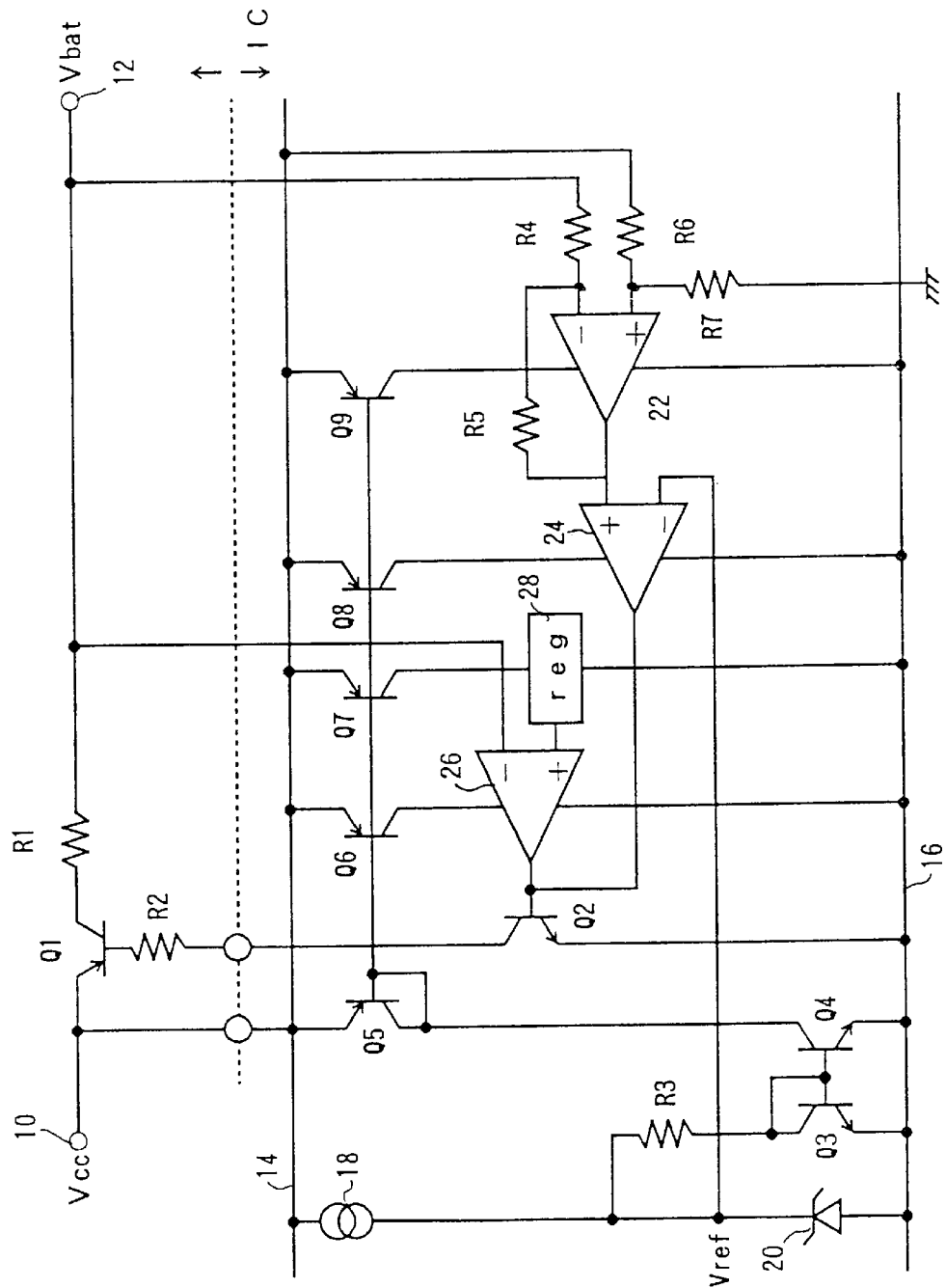
FIG. 4 is a circuit diagram of a conventional battery charge control circuit.

FIG. 1 is a circuit diagram of a first embodiment of a battery charge control circuit according to the present invention. Parts identical to those shown in FIG. 4 are numbered identically. As shown in FIG. 1, a supply voltage Vcc is supplied to the line terminal 10 and a battery to be charged is connected to the output terminal 12. The line terminal 10 is connected to the emitter of PNP-type output transistor Q1. The collector of transistor Q1 is connected to the output terminal 12 via a current-sensing resistor R1. The base of transistor Q1 is connected to the collector of NPN-type control transistor Q2 within the semiconductor integrated circuit via a base resistor R2.

Within the semiconductor integrated circuit, between a ground line 16 and a power line 14 connected to the line terminal 10, a constant-current power supply 18 and a Zener diode 20 are connected in series. A reference voltage Vref is generated at the Zener diode 20. Additionally, one end of a resistor R3 is connected to the constant-current power supply 18, the other end of the resistor R3 being connected to the collector of an NPN-type transistor Q3. Transistor Q3 is connected across a collector-base gap and at the same time that base is jointly connected to the base of an NPN-type transistor Q4, the respective emitters of transistors Q3 and Q4 being grounded to form a current mirror circuit. The reference voltage makes the transistor Q3 emitter current constant and the transistor Q4 emitter current becomes constant.

The transistor Q4 collector is connected to the collector and base of PNP-type transistor Q5. Transistor Q5 is jointly connected to the bases of PNP-type transistors Q6, Q10, Q11 and Q12, respectively. The emitters of transistor Q5, Q6 and Q10 are connected to the power line 14 via resistors R10, R11 and R12, respectively. The emitters of transistor Q11 and Q12 are connected to the power line 14 via resistor R13, thus forming a current mirror circuit.

The collector of transistor Q6 is connected to the differential amplifier 26 and an actuating current is supplied to the differential amplifier 26. The collector of transistor Q10 is connected to the collector of NPN-type transistor Q14, the collector of transistor Q11 is connected to the base and the collector of transistor Q12 is connected to the collector of NPN-type transistor Q16. Transistor Q14 is connected across the collector-base gap and, at the same time, the base thereof is jointly connected to the base of NPN-type transistor Q13. The emitters of transistors Q13 and Q14, respectively, are grounded, thus forming a current mirror circuit. The collector of transistor Q13 is connected to constant-voltage power supply 28. Transistor Q16 is connected across the collector-base gap and, at the same time, the base thereof is jointly connected to the base of NPN-type transistor Q15. The emitters of transistors Q15 and Q16, respectively, are grounded, thus forming a current mirror circuit. The collector of transistor Q15 is connected to the emitter of transistor Q10.

Constant-voltage power supply 28 is connected to the power line 14 via constant-current power supply 30 and, at the same time, is grounded to ground line 16 via transistor Q13. The closing of transistor Q13 supplies an actuating current, and a constant voltage Vreg is generated based on the reference voltage Vref supplied from the Zener diode 20 and supplied to the noninverted input terminal of the differential amplifier 26.

Figure 2:
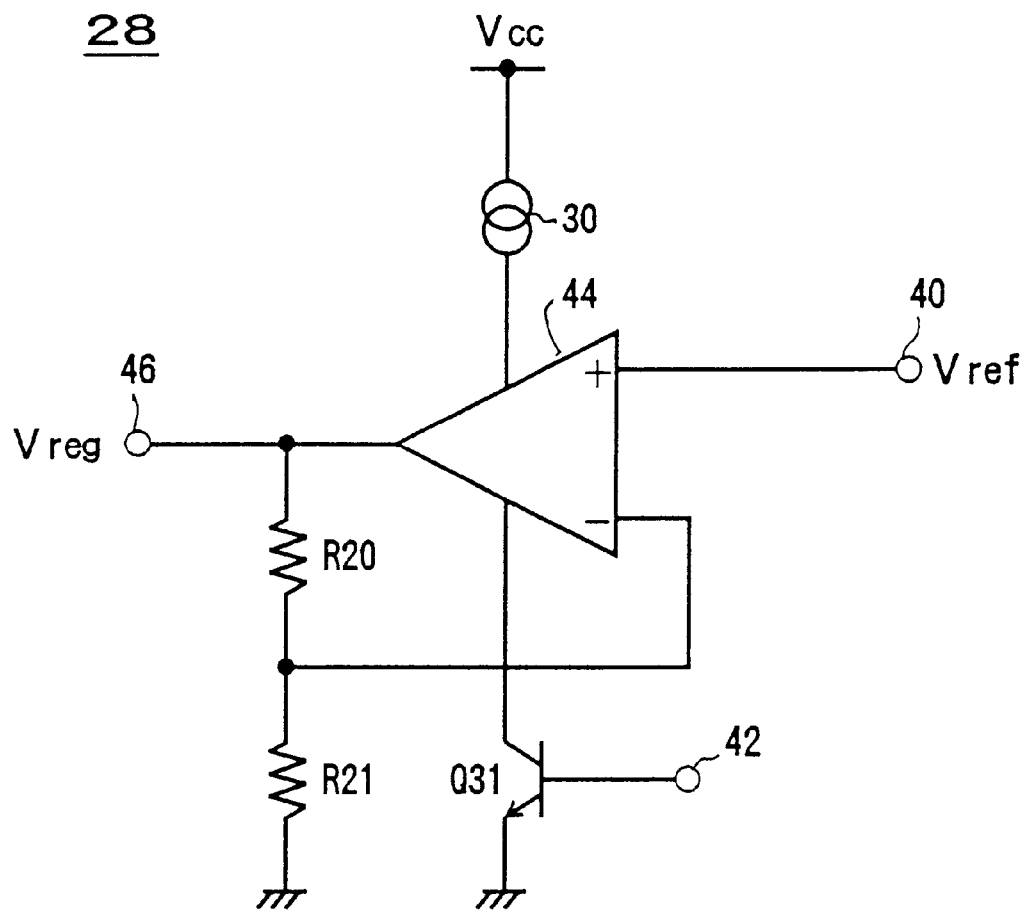
FIG. 2 is a circuit diagram of an embodiment of a constant-voltage power supply 28 according to the present invention.

FIG. 2 is a circuit diagram of an embodiment of the constant-voltage power supply 28. A reference voltage Vref is supplied to a terminal 40 and a terminal 42 is connected to the base of transistor Q13. The operational amplifier 44 is supplied with current from the constant-current power supply 30 and, at the same time, a reference voltage Vref is supplied to the noninverted input terminal of the operational amplifier 44. By dividing the voltage of the output terminal of the operational amplifier 44 by resistors R20 and R21 and feeding back the divided value to the noninverted input terminal, a constant voltage Vreg, expressed as Vref•(R20+R21)/R21, is output from a terminal 46.

A voltage Vbat is supplied from the output terminal to the inverted input terminal of the differential amplifier 26 and the differential amplifier 26 supplies a difference in voltage between the voltage Vbat and a constant voltage Vreg to the base of control transistor Q2. In so doing, during a normal operation the control transistor Q2 transmits a collector current corresponding to the difference in voltage between Vbat and Vreg and, based on this collector current, output transistor Q1 switches so as to adjust the output terminal 12 voltage Vbat to a value corresponding to constant voltage Vreg.

It should be noted at this point that the collector current of transistor Q5 is determined by resistors R3 and R10 as well as by transistor Q4. Additionally, the respective collector currents of transistors Q6, Q10, Q11 and Q12, respectively, are determined by resistors R11, R12 and R13. As a result, R12 is set so as to be greater than R11 and a voltage drop of resistor R12 is set so as to be greater than the sum of a voltage drop of resistor R13 plus a voltage drop across the base-emitter gap of transistor Q11 (or Q12).

As a result, when the supply voltage Vcc is less than the output voltage Vbat, transistors Q11 and Q12 close and transistors Q16 and Q15 close. As a result, transistors Q10, Q14 and Q13 are cut off, thus cutting off the supply of actuating current to the constant-voltage power supply 28. At the differential amplifier 26 the voltage Vbat becomes greater than the reference voltage Vref, transistors Q2 and Q1 are cut off and charging of the battery is terminated.

At the same time, when the supply voltage Vcc is greater than the sum of the output voltage Vbat+α (where α is a positive predetermined value), transistors Q11 and Q12 are cut off and transistors Q16 and Q15 are cut off. As a result, transistors Q10, Q14 and Q13 close, thus supplying an actuating current to the constant-voltage power supply 28. At the differential amplifier 26 the voltage Vbat becomes greater than the constant voltage Vreg, control transistor Q2 transmits a collector current corresponding to the difference in voltage between the voltage Vbat and the constant voltage Vreg, and based on this collector current the output transistor Q1 adjusts the output current so that the output terminal 12 voltage Vbat is adjusted to a value corresponding to constant voltage Vreg. It should be noted that the value α noted above can be easily set simply by changing the resistance of resistors R12 and R13.

When the above-described circuit is activated, together with output of reference voltage Vref transistors Q5, Q6, Q10, Q11 and Q12 are also activated and, thereafter, transistor Q13, Q14, Q15 and Q16 are activated, activating the constant-voltage power supply 28 and, further, the differential amplifier 26. As a result, the differential amplifier 26 does not begin operation first, thus preventing improper operation.

Through the operation of transistors Q10, Q11, Q12, Q13, Q14, Q15 and Q16 and resistors R10, R11, R12 and R13 as described above, it is thus possible to charge a battery in the conventional manner. At the same time, because the above-described embodiment of a battery charge control circuit according to the present invention does not make use of a differential amplifier circuit having an operational amplifier or of comparators or other circuits having large numbers of elements it is possible to greatly reduce the number of elements and thus reduce the size of the circuit. Additionally, the above-described embodiment of the battery charge control circuit supplies an actuating current to the constant-voltage power supply 28 only when charging the battery and transistors Q11, Q12, Q15 and Q16 are cut off, thereby eliminating unnecessary power consumption.

Figure 3:
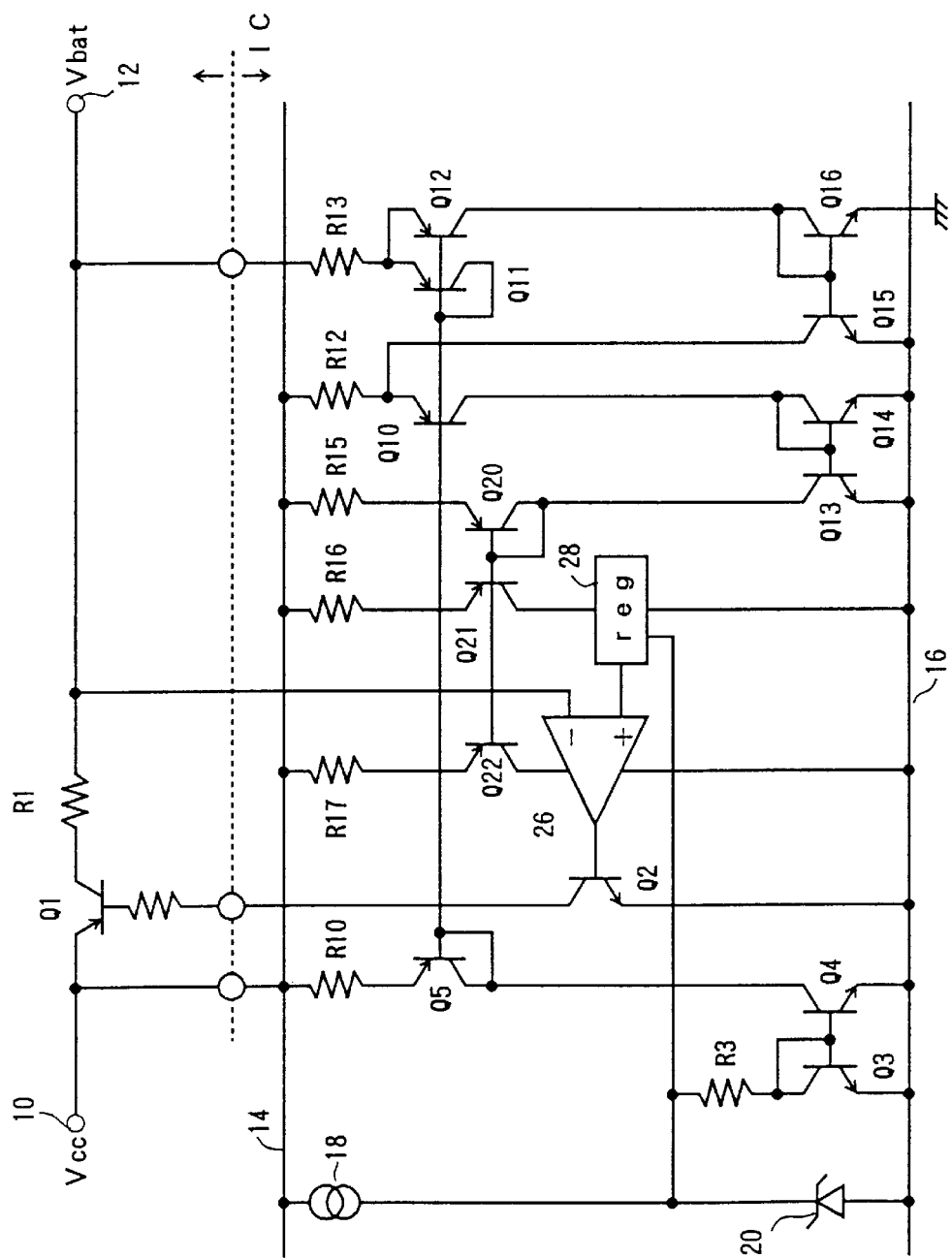
FIG. 3 is a diagram of a second embodiment of a battery charge control circuit according to the present invention.

FIG. 3 is a diagram of a second embodiment of a battery charge control circuit according to the present invention. Parts identical to those shown in FIG. 1 are numbered identically. As shown in FIG. 3, the supply voltage Vcc is supplied to the line terminal 10 and a battery to be charged is connected to the output terminal 12. The line terminal 10 is connected to the emitter of a PNP-type output transistor Q1. The collector of transistor Q1 is connected to output terminal 12 via current-sensing resistor R1. The base of transistor Q1 is connected via base resistor R2 to the collector of NPN-type control transistor Q2 within semiconductor integrated circuit.

Within the semiconductor integrated circuit, between a ground line 16 and a power line 14 connected to the line terminal 10, a constant-current power supply 18 and a Zener diode 20 are connected in series. A reference voltage Vref is generated at the Zener diode 20. Additionally, one end of a resistor R3 is connected to the constant-current power supply 18, the other end of the resistor R3 being connected to the collector of an NPN-type transistor Q3. Transistor Q3 is connected across a collector-base gap and at the same time that base is jointly connected to the base of an NPN-type transistor Q4, the respective emitters of transistors Q3 and Q4 being grounded to form a current mirror circuit. The reference voltage makes the transistor Q3 emitter current constant and the transistor Q4 emitter current becomes constant.

The collector of transistor Q4 is connected to the collector and base of Q4 PNP-type transistor Q5. Transistor Q5 is jointly connected to the respective bases of PNP-type transistors Q10, Q11 and Q12. The respective emitters of transistors Q5 and Q10 are connected to the power line 14 via resistors R10 and R12, respectively. The respective emitters of transistors Q11 and Q12 are connected to the power line 14 via resistor R13 to form a current mirror circuit.

The transistor Q10 collector is connected to the collector of NPN-type transistor Q14. The collector of transistor Q11 is connected to the base. The collector of transistor Q12 is connected to the collector of NPN-type transistor Q16. Transistor Q14 is connected across a collector-base gap and, at the same time, that base is jointly connected to the base of NPN-type transistor Q13. The respective emitters of transistors Q13 and Q14 are grounded to form a current mirror circuit. Transistor Q16 is connected across the collector-base gap and, at the same time, that base is jointly connected to the base of NPN-type transistor Q15. The respective emitters of transistors Q15 and Q16 are grounded to form a current mirror circuit. The collector of transistor Q15 is connected to the emitter of transistor Q10.

The collector of transistor Q13 is connected to the collector and base of PNP-type transistor Q20. Transistor Q20 is jointly connected to the respective bases of transistors Q21 and Q22. The respective emitters of transistors Q20, Q21 and Q22 are connected to the power line 14 via resistors R15, R16 and R17, respectively. The respective collectors of transistors Q21 and Q22 are connected to the line terminals of the constant-voltage power supply 28 and the differential amplifier 26, respectively.

The closing of transistor Q21 supplies an actuating current to the constant-voltage power supply 28. A constant voltage Vreg is generated based on the reference voltage Vref supplied from the Zener diode 20 and is supplied to the noninverted input terminal of the differential amplifier 26. The differential amplifier 26 is supplied with an actuating current by the closing of transistor Q22 and a voltage Vbat from output terminal 12 is supplied to the inverted terminal of the differential amplifier 26. The differential amplifier 26 supplies the difference in voltage between the Vbat and the Vreg to the base of control transistor Q2. As a result, during a normal operation the control transistor Q2 transmits a collector current corresponding to the difference in voltage between Vbat and Vreg and, based on this collector current, output transistor Q1 switches so as to adjust the output terminal 12 Vbat to a value corresponding to Vreg.

It should be noted at this point that the collector current of transistor Q5 is determined by resistors R3 and R10 as well as by transistor Q4. Additionally, the respective collector currents of transistors Q10, Q11 and Q12, respectively, are determined by resistors R12 and R13. As a result, R12 is set so as to be greater than R13 and a voltage drop of resistor R12 is set so as to be greater than the sum of a voltage drop of resistor R13 plus a voltage drop across the base-emitter gap of transistor Q11 (or Q12).

As a result, when the supply voltage Vcc is less than the output voltage Vbat, transistors Q11 and Q12 close and transistors Q16 and Q15 close. As a result, transistors Q10, Q14, Q13, Q20, Q21 and Q22 are cut off, thus cutting off the supply of actuating current to the constant-voltage power supply 28 and to the differential amplifier 26. As a result, transistors Q2 and Q1 are cut off and charging of the battery is terminated.

At the same time, when the supply voltage Vcc is greater than the sum of the output voltage Vbat+α (where α is a positive predetermined value), transistors Q11 and Q12 are cut off and transistors Q16 and Q15 are cut off. As a result, transistors Q10, Q14, Q13, Q20, Q21 and Q22 close, thus supplying an actuating current to the to the constant-voltage power supply 28 and to the differential amplifier 26. At the differential amplifier 26 the voltage Vbat becomes greater than the constant voltage Vreg, control transistor Q2 transmits a collector current corresponding to a difference in voltage between a voltage Vbat and a constant voltage Vreg, and based on this collector current the output transistor Q1 adjusts the output current so that the output terminal 12 voltage Vbat is adjusted to a value corresponding to constant voltage Vreg. It should be noted that the value α noted above can be easily set simply by changing the resistance of resistors R12 and R13.

When the above-described circuit is activated, together with output of reference voltage Vref transistors Q5, Q6, Q10, Q11 and Q12 are also activated and, thereafter, transistor Q13, Q14, Q15 and Q16 are activated, activating transistors Q20, Q21 and Q22 and activating the constant-voltage power supply 28 and, further, the differential amplifier 26. As a result, the differential amplifier 26 does not begin operation first, thus preventing improper operation.

In the present embodiment, actuating current is supplied to the constant-voltage power supply 28 and to the differential amplifier 26 only while the battery is charging, thereby eliminating unnecessary power consumption.

As can be readily appreciated, transistors Q11, Q12, Q13, Q14, Q15 and Q16 correspond to the first transistor as described above and transistors Q10, Q13, Q14, Q15, Q16, Q17, Q18, Q19, Q20, Q21 and Q22 correspond to the second transistor as described above.

The above description is provided in order to enable any person skilled in the art to make and use the invention and sets forth the best mode contemplated by the inventors of carrying out their invention. The present invention is not limited to the specifically disclosed embodiments, and variations and modifications may be made without departing from the scope of the present invention.

The present application is based on Japanese priority application No. 10-119028 filed on Apr. 28, 1998, the entire contents of which are hereby incorporated by reference.

What is claimed is:

1. A battery charge control circuit for charging a battery by variably adjusting a current of an output transistor provided between a line terminal and an output terminal to which a battery is connected based on a difference in voltage between a voltage of a power supply and a voltage of the output terminal, the battery charge control circuit comprising:

a first transistor that is cut off when the voltage of the output terminal is lower than a voltage of the line terminal and closed when it is not; and a second transistor that closes to supply an actuating current to a circuit that generates a constant voltage when the first transistor is cut off.

2. The battery charge control circuit as claimed in claim 1, the second transistor supplying an actuating current to a circuit obtaining a difference in voltage between the power supply and the voltage of the output terminal to which the battery is connected when the second transistor is closed.

* * * * *